UNITED STATES PATENT OFFICE.

ROBERT N. RIDDLE, OF RAHWAY, NEW JERSEY, ASSIGNOR OF THREE-FOURTHS TO HERMAN A. LOEB, OF NEW YORK, N. Y.

COCOA DERIVATIVE AND THE PROCESS OF SEPARATING CONSTITUENTS OF THE CACAO-BEAN.

1,073,441.  Specification of Letters Patent.  Patented Sept. 16, 1913.

No Drawing.  Application filed March 17, 1913. Serial No. 754,819.

*To all whom it may concern:*

Be it known that I, ROBERT N. RIDDLE, a citizen of the United States, residing at Rahway, county of Union, State of New Jersey, have invented a Cocoa Derivative and a Process of Separating Constituents of the Cacao-Bean, of which the following is a specification.

The complete extraction of the cacao butter, or fat of the cacao bean, and of the alkaloids contained in the bean, is not effected in the manufacture of cacao powder as at present practised, nor is it even attempted. The roasted and shelled cacao beans, broken into the form of " cacao nibs," are commonly ground between revolving heated stones so that the cacao mass, because of the high per cent. of fat that it contains, is melted and flows from the grinding stones at a temperature of about 100° to 115°. F. and is usually run into pans where it is allowed to solidify. Or the melted cacao mass is run direct from the grinding mill into a hydraulic press, where under very heavy pressure it loses some 60 to 70 per cent. of the contained fat or cacao butter. The cacao left in the press is allowed to cool and then crushed, disintegrated, and reduced to a fine powder. This cacao powder still contains a notable amount of fat and all the other constituents of the original cacao mass. I propose to remove all of the fat and the alkaloids (theobromin and caffein) from the cacao bean, leaving all the other constituents of the bean in the completely fat-free powder, which constitutes a new product of agreeable taste and great nutritive value.

Extraction of the fat of the cacao bean by the aid of solvents has not been practised on a manufacturing scale for what appeared to be good reasons. These reasons have been mainly because of difficulties in making the extraction complete and because of the persistence with which traces of the solvents adhered to the cacao powder left after separation from the fat solution.

I have found after long experiment with different solvents under a variety of conditions that I can effect the desired extraction of both the fat and the alkaloids with chloroform (a chlorinated hydrocarbon) as the solvent and, by reason of the method of extracting which I have devised, I can effect the extraction with a completeness never before attained. I am able moreover to obtain as a new and valuable product a residual cacao powder perfectly free from any trace of odor of the solvent and with the characteristic cacao taste and flavor fully preserved.

In carrying out my extraction and practising my invention I prefer to proceed as follows: The cacao beans, after cleaning, sorting and roasting, are shelled and then ground into an impalpable mass according to the general practice of the cocoa manufacturers. The resultant mass, known in the trade as " liquor," is taken hot from the grinding mill and at once mixed with water (preferably hot) in the proportion of 100 lbs. of liquor to 50 or 60 lbs. of water. If the cacao powder is to have the alkali treatment known as " ditching," a small amount of alkali may be added here in the proportions generally used for that purpose, but the alkali treatment is not an essential part of my process and the success of my treatment of the cacao liquor is not dependent upon it. The hot mixture of the liquor and the water is rapidly and continuously stirred. In a short time it becomes uniformly liquid but soon begins to set or harden, due most probably to the swelling of the starchy matter in the cacao when treated with hot water. After the mass has become moderately hard but not brittle, it is made up into small forms such as tablets or briquets or molded shapes of any convenient kind. I have found that a very suitable form is that of long pencils or rods obtained by forcing the hardening mass through a screen with holes of about ¼ inch in diameter. These pencils are left in a warm room provided with good ventilation, undisturbed until most of the water has evaporated out of them, leaving from 5 to 15 per cent. only of water in the material. If the operation has been properly conducted, the pencils will be reasonably hard with numberless small cracks on the surface. In such condition I have found them to be excellently adapted for the complete extraction by the solvent. The pencils (or dried briquets, if that form be used) are now put into an extractor fitted over a still and provided with a return condenser, and the extraction, with vapor of chloroform, is continued until a sample of the solvent as it drains from the extractor shows complete freedom from either fat or alkaloid. Dry steam is then passed through the extractor until all trace of the chloroform has disappeared and the contents of the extractor are dried by warm air or other suitable means and then emptied out. The pencils or briquets generally hold their form throughout all this treatment but after drying they crumble on slight pressure into an impalpable powder, which cacao powder is now fat-free and alkaloid-free, but preserves the characteristic cacao flavor and taste and retains the nutritive value due to the carbohydrates and the proteids of the cacao-bean. The chloroform solution is dry distilled until it reaches a temperature of 90° C. and then cooled somewhat and filtered whereby the alkaloids are separated from the melted cacao butter. The alkaloids on the filter can be washed with a little fresh chloroform to free them from adhering traces of the fat and the butter is then placed in a still and the last trace of solvent driven off by free steam. The yield of cacao butter is of course much greater than that now obtained by the common method of pressing, the quality is purer and its melting point higher than that obtained by hydraulic pressure. The alkaloids obtained are refined in the usual manner employed in the refining of alkaloids.

Having described my invention, I claim:

1. The process which comprises the treatment of a cacao bean product containing fat and alkaloids, with a solvent for said fat and alkaloids until substantially all of said fat and alkaloids have been extracted from said product and then driving off the solvent from said fat and alkaloids.

2. The process which comprises the combination of a cacao bean product containing fat and alkaloid, with a chlorinated hydrocarbon capable of extracting said fat and alkaloid, and driving off said chlorinated hydrocarbon from said fat and alkaloid.

3. The process which comprises the combination of a cacao bean product containing fat and alkaloid, with chloroform so that said fat and alkaloid are dissolved and driving off said chloroform from said fat and alkaloid.

4. The process which comprises the production of a melted cacao mass, adding water thereto, molding and drying the product resulting from the combination of said water with said mass, extracting fat and alkaloids from said last named product by a solvent therefor, and driving off the solvent from the fat and alkaloids.

5. The process which comprises the combination with a roasted and ground cacao mass, of hot water, molding the product into suitable shapes for extracting, drying such shapes, and extracting the fat and alkaloids from said last named shapes by a solvent.

6. The process which comprises the combination with a hot liquid cacao mass, of hot water accompanied by stirring, forming the product into suitable shapes, and extracting the cacao butter and alkaloids therefrom by a solvent.

7. The process which comprises the production of a cacao product containing cacao butter and alkaloids, treating said product with a solvent (such as chloroform) for said cacao butter and alkaloids, heating the resulting solution so as to drive off the substantial part of the solvent, cooling and filtering off the separated alkaloids, and then driving off the last traces of the solvent.

8. The process of obtaining the combined alkaloids of the cacao bean which consists in simultaneously extracting them together with the fat of the bean by means of a solvent therefor, then chilling the extracted alkaloids and fat until the alkaloids separate and then filtering to separate said alkaloids from the fat.

9. A cacao powder containing no fat.

10. A cacao powder containing no alkaloid.

11. A cacao powder free from fat and alkaloids.

12. A cacao powder free from fat and alkaloids and containing the carbohydrate and protein constituents of the cacao bean.

In witness whereof I have hereunto set my hand this twelfth day of March, 1913, in the presence of the subscribing witnesses.

ROBERT N. RIDDLE.

Witnesses:
CHARLES H. WEISS,
ANNA D. GATES.